(12) United States Patent
Dighton et al.

(10) Patent No.: US 11,812,694 B2
(45) Date of Patent: Nov. 14, 2023

(54) MONITOR SYSTEM FOR A HARVESTER

(71) Applicant: Deere & Company, Moline, IL (US)

(72) Inventors: John A. Dighton, Thibodaux, LA (US); Bryan E. Dugas, Napoleonville, LA (US); Rahul Gunda, Pune (IN); Peter A. Johnson, Thibodaux, LA (US)

(73) Assignee: Deere & Company, Moline, IL (US)

( * ) Notice: Subject to any disclaimer, the term of this patent is extended or adjusted under 35 U.S.C. 154(b) by 388 days.

(21) Appl. No.: 17/039,997

(22) Filed: Sep. 30, 2020

(65) Prior Publication Data
US 2021/0015042 A1    Jan. 21, 2021

Related U.S. Application Data

(63) Continuation of application No. 15/882,907, filed on Jan. 29, 2018, now Pat. No. 10,827,676.

(51) Int. Cl.
*G06V 20/56*     (2022.01)
*A01D 41/14*     (2006.01)
(Continued)

(52) U.S. Cl.
CPC ......... *A01D 41/141* (2013.01); *A01D 41/127* (2013.01); *A01D 41/1217* (2013.01);
(Continued)

(58) Field of Classification Search
CPC .. G06V 20/56; G06V 2201/12; G06V 20/188; G06V 10/82; G06V 10/10;
(Continued)

(56) References Cited

U.S. PATENT DOCUMENTS 3,398,516 A    8/1968  Jonathan
3,448,564 A    6/1969  Chauffe
(Continued)

FOREIGN PATENT DOCUMENTS

CN    102523831 A    7/2012
CN    107343417 A    11/2017
(Continued)

OTHER PUBLICATIONS

BCC Research, "Brief History of LiDAR, Its Evolution and Market Definition," <https://blogbccresearch.com/brief-history-of-lidar-evolution-and-market-definition> Mar. 20, 2018.
(Continued)

*Primary Examiner* — Arpad F Kovacs
(74) *Attorney, Agent, or Firm* — Michael Best & Friedrich LLP

(57) ABSTRACT

A harvester including a mono-camera having a first field of view, where the camera outputs a first image representative of the first field of view, and where the first image is a two-dimensional representation of the first field of view. The harvester also includes a controller in operable communication with the mono-camera, where the controller establishes a second two-dimensional reference frame fixed relative to the first field of view, where the controller identifies a reference point within the first image, where the controller locates the reference point within the second two-dimensional reference frame, and where the controller calculates the location of the reference point relative to the first, three-dimensional reference frame based on the position of the reference point within the second two-dimensional reference frame.

13 Claims, 15 Drawing Sheets

(51) Int. Cl.
*A01D 41/127* (2006.01)
*G06T 7/73* (2017.01)
*G06V 20/10* (2022.01)
*G06T 7/80* (2017.01)
*G06V 10/10* (2022.01)
*A01D 41/12* (2006.01)
*A01D 43/073* (2006.01)
*A01D 43/08* (2006.01)
*A01D 43/063* (2006.01)
*A01D 63/04* (2006.01)
*A01D 47/00* (2006.01)
*A01D 90/02* (2006.01)

(52) U.S. Cl.
CPC ....... *A01D 43/0631* (2013.01); *A01D 43/073* (2013.01); *A01D 43/087* (2013.01); *G06T 7/74* (2017.01); *G06T 7/80* (2017.01); *G06V 10/10* (2022.01); *G06V 20/188* (2022.01); *G06V 20/56* (2022.01); *A01D 47/00* (2013.01); *A01D 63/04* (2013.01); *A01D 90/02* (2013.01); *G06T 2207/10028* (2013.01); *G06T 2207/30252* (2013.01); *G06V 2201/12* (2022.01)

(58) Field of Classification Search
CPC . G06T 2207/30252; G06T 2207/30188; G06T 2207/10028; G06T 7/80; G06T 7/74; G06T 7/73; A01D 90/02; A01D 63/04; A01D 47/00; A01D 45/10; A01D 43/087; A01D 43/085; A01D 43/073; A01D 43/0631; A01D 41/141; A01D 41/127; A01D 41/1217
See application file for complete search history.

(56) References Cited

U.S. PATENT DOCUMENTS

| | | | |
|---|---|---|---|
| 4,270,337 A | | 6/1981 | Pinto |
| 5,749,783 A | * | 5/1998 | Pollklas ............. G05D 3/12 56/10.2 D |
| 5,995,895 A | | 11/1999 | Watt et al. |
| 6,389,785 B1 | | 5/2002 | Diekhans |
| 8,452,501 B1 | | 5/2013 | Lange et al. |
| 9,226,449 B2 | | 1/2016 | Bischoff |
| 9,320,196 B2 | | 4/2016 | Dybro et al. |
| 9,629,308 B2 | | 4/2017 | Scholer et al. |
| 9,668,420 B2 | | 6/2017 | Anderson et al. |
| 9,723,784 B2 | | 8/2017 | Bremer et al. |
| 9,807,933 B2 | | 11/2017 | Boyd et al. |
| 9,915,952 B2 | * | 3/2018 | Dollinger ............. G05D 1/0276 |
| 10,254,147 B2 | * | 4/2019 | Vermue .................. G01S 13/931 |
| 10,318,138 B2 | | 6/2019 | Scholer et al. |
| 10,371,561 B2 | * | 8/2019 | Darr .................... G01F 25/0084 |
| 10,966,369 B2 | * | 4/2021 | Suleman ............... B65G 67/24 |
| 2003/0004630 A1 | | 1/2003 | Beck |
| 2003/0075145 A1 | | 4/2003 | Sheidler et al. |
| 2003/0187560 A1 | | 10/2003 | Keller et al. |
| 2004/0186597 A1 | | 9/2004 | Wippersteg et al. |
| 2005/0279070 A1 | | 12/2005 | Pirro et al. |
| 2006/0026939 A1 | | 2/2006 | Kormann |
| 2007/0056258 A1 | | 3/2007 | Behnke |
| 2008/0155953 A1 | | 7/2008 | Cleodolphi |
| 2009/0037059 A1 | | 2/2009 | Huster et al. |
| 2010/0036696 A1 | | 2/2010 | Lang et al. |
| 2011/0205084 A1 | * | 8/2011 | Morselli ............. G05D 1/0234 382/104 |
| 2013/0116894 A1 | | 5/2013 | Perez-Iturbe et al. |
| 2013/0184944 A1 | | 7/2013 | Missotten et al. |
| 2013/0205733 A1 | | 8/2013 | Peters et al. |
| 2013/0211658 A1 | * | 8/2013 | Bonefas ............. A01D 43/087 701/28 |
| 2013/0211675 A1 | * | 8/2013 | Bonefas ............. B62D 12/02 701/41 |
| 2014/0083556 A1 | * | 3/2014 | Darr ..................... A01D 43/087 141/95 |
| 2014/0215984 A1 | | 8/2014 | Bischoff |
| 2014/0224377 A1 | * | 8/2014 | Bonefas .............. G05D 1/0251 141/94 |
| 2014/0230391 A1 | | 8/2014 | Hendrickson et al. |
| 2014/0236381 A1 | | 8/2014 | Anderson et al. |
| 2014/0338298 A1 | | 11/2014 | Jung et al. |
| 2015/0105984 A1 | | 4/2015 | Birrell et al. |
| 2015/0124054 A1 | | 5/2015 | Darr et al. |
| 2015/0242799 A1 | | 8/2015 | Seki et al. |
| 2015/0243114 A1 | | 8/2015 | Tanabe et al. |
| 2015/0262351 A1 | | 9/2015 | Dima |
| 2015/0264863 A1 | | 9/2015 | Muench et al. |
| 2015/0305238 A1 | | 10/2015 | Klausmann et al. |
| 2015/0305239 A1 | | 10/2015 | Jung et al. |
| 2015/0362904 A1 | | 12/2015 | Scrivner et al. |
| 2016/0029558 A1 | | 2/2016 | Dybro et al. |
| 2016/0084813 A1 | | 3/2016 | Anderson et al. |
| 2016/0084987 A1 | | 3/2016 | Dybro et al. |
| 2016/0106038 A1 | | 4/2016 | Boyd et al. |
| 2016/0215994 A1 | | 7/2016 | Mewes et al. |
| 2016/0330906 A1 | | 11/2016 | Acheson et al. |
| 2017/0042088 A1 | * | 2/2017 | Nykamp ............. A01D 41/1217 |
| 2017/0055446 A1 | * | 3/2017 | Nykamp .................. B60R 1/00 |
| 2017/0089742 A1 | | 3/2017 | Bruns et al. |
| 2017/0118915 A1 | | 5/2017 | Middelberg et al. |
| 2017/0185086 A1 | | 6/2017 | Sauder et al. |
| 2017/0215330 A1 | | 8/2017 | Missotten et al. |
| 2017/0251600 A1 | | 9/2017 | Anderson et al. |
| 2017/0318743 A1 | | 11/2017 | Sauder et al. |
| 2018/0164471 A1 | | 6/2018 | Dybro et al. |
| 2018/0196441 A1 | | 7/2018 | Muench et al. |
| 2018/0211156 A1 | | 7/2018 | Guan et al. |
| 2018/0271015 A1 | | 9/2018 | Redden et al. |
| 2018/0325014 A1 | | 11/2018 | Debbaut |
| 2019/0021226 A1 | | 1/2019 | Dima et al. |
| 2019/0327892 A1 | | 10/2019 | Fries et al. |
| 2020/0020103 A1 | | 1/2020 | Sneyders et al. |
| 2021/0015040 A1 | | 1/2021 | Neitemeier et al. |
| 2022/0167557 A1 | | 6/2022 | Reiners et al. |

FOREIGN PATENT DOCUMENTS

| | | | | |
|---|---|---|---|---|
| DE | 2654141 A1 | 6/1978 | | |
| DE | 102005000771 A1 | 8/2006 | | |
| DE | 102016118637 A1 | 4/2018 | | |
| EP | 3530099 A1 | 8/2019 | | |
| EP | 3987913 A1 | 4/2022 | | |
| WO | 1985/000268 A1 | 1/1985 | | |
| WO | WO-2013120063 A1 | * | 8/2013 | ......... A01D 41/1217 |
| WO | WO-2013120079 A1 | * | 8/2013 | ........... A01D 43/087 |
| WO | WO-2013141975 A2 | * | 9/2013 | ......... A01D 43/087 |
| WO | WO-2013162673 A2 | * | 10/2013 | ............. A01B 69/00 |
| WO | WO-2013184178 A2 | * | 12/2013 | ............. A01D 43/06 |
| WO | 2014093814 A1 | 6/2014 | | |
| WO | 2022/003461 A1 | 1/2022 | | |
| WO | 2022/018656 A1 | 1/2022 | | |

OTHER PUBLICATIONS

Canta et al., "Measuring height of sugarcane plants through LiDAR technology," Proceedings of the 13th International Conference on Precision Agriculture, 2016, pp. 1-13.
Inter-American Development Bank, "What is the precision agriculture? Why it is a likely answer to climate change and food security?" <https://www.youtube.com/watch?v=581Kx8wzTMc> Nov. 28, 2017.
Lee, "Why experts believe cheaper, better lidar is right around the corner," <https://arstechnica.com/cars/2018/01/driving-around-without-a-driver-lidar-technology-explained/> Jan. 1, 2018.
Pei, "11 Myths About LiDAR Technology," <https://www.electronicdesign.com/markets/automotive/article/21807556/11-myths-about-lidar-technology> Feb. 7, 2019.

(56) References Cited

OTHER PUBLICATIONS

Saracco, "LiDAR is Getting Cheaper," <https://cmte.ieee.org/futuredirections/2019/07/16/lidar-is-getting-cheaper/> Jul. 16, 2019.

* cited by examiner

MONITOR SYSTEM FOR A HARVESTER

RELATED APPLICATION

This application is a continuation of U.S. Ser. No. 15/882,907, filed Jan. 29, 2018, the entire content of which is incorporated herein by reference.

FIELD

The present disclosure relates to a harvester and more specifically to a harvester having one or more control systems to adjust the operating parameters of the device.

BACKGROUND

During the harvesting process, the operator of the harvester is required to constantly observe their surroundings and adjust the harvester operating parameters based on those observations. Such adjustments and observations can be difficult and lend themselves to inaccuracies both in the initial observations and the determined adjustments.

SUMMARY

In one implementation, a harvester including a frame supported by a drive assembly for movement along a support surface, a head unit coupled to the harvester and configured to selectively harvest crop material, a camera coupled to the frame and configured to generate one or more images of a field of view, and a controller in operable communication with the camera and the head unit, where the controller is configured to determine one or more crop attributes based at least in part on the one or more images produced by the camera.

In another implementation, a method of operating a harvester including providing a harvester with a frame, a head unit coupled to the frame, and an unload assembly having a material output that is movable with respect to the frame. The method further including establishing a first reference frame fixed relative to the frame, mounting a camera to the harvester having a field of view, wherein the camera is configured to output an image representative of the field of view, identifying a reference point within the image, and calculating the location of the reference point relative to the first frame of reference.

In another implementation, a harvester including a frame, a head unit coupled to the frame, an unloading assembly with a material output, where the material output is movable with respect to the frame, a camera having a first field of view, where the camera is configured to output a first image representative of the first field of view, and a controller in operable communication with the camera, where the controller is configured to identify a reference point within the first image, and where the controller is configured to calculate the location of the reference point relative to the frame.

In another implementation, a harvester including a frame, a head unit coupled to the frame, an unloading assembly including, a base fixedly coupled to the frame, a body movable with respect to the base, and a material output formed by the body, and a camera having a first field of view at last partially including the unloading assembly therein, where the camera is configured to output a first image representative of the first field of view, and a controller in operable communication with the camera, where the controller is configured to determine the position of the reference point relative to a two-dimensional reference frame overlaid onto the first image, and where the controller is configured to calculate the orientation of the body relative to the frame based at least in part on the location of the reference point within the two-dimensional reference frame.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

During harvesting operations, multiple sensors must be used to provide feedback to the control system and the operator. Harvesting machine operators are responsible for many machine settings and configurations in order to harvest optimally and safely. Sensors can provide feedback but some specific pieces of information require multiple sensors measuring multiple functions. By including a single, three-dimensional camera many of those sensors can be eliminated thereby providing a simpler and more cost effective way to operate the harvester.

Figure 1:
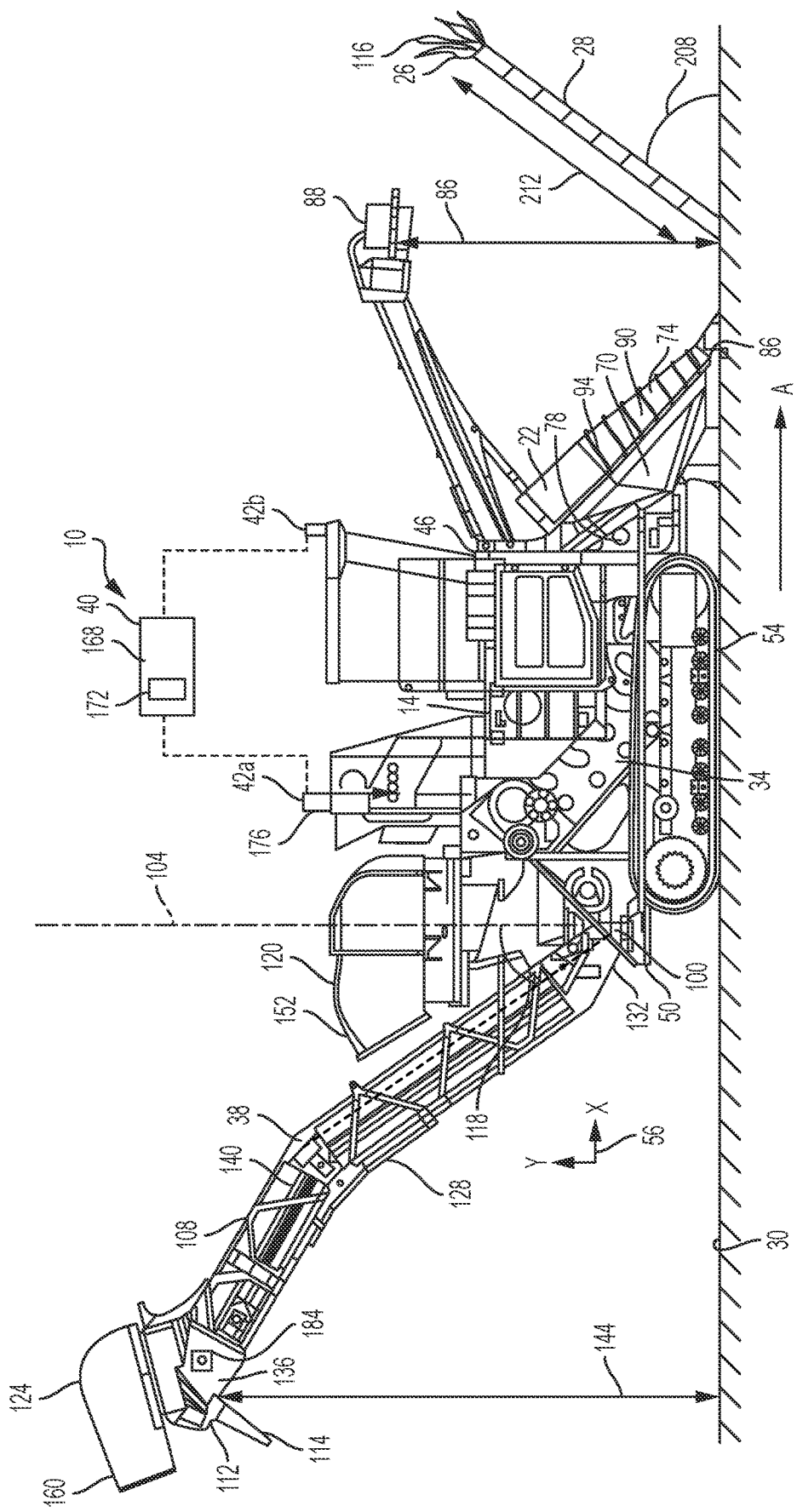
FIG. 1 is a side view of a harvester with one or more control systems.
Figure 2:
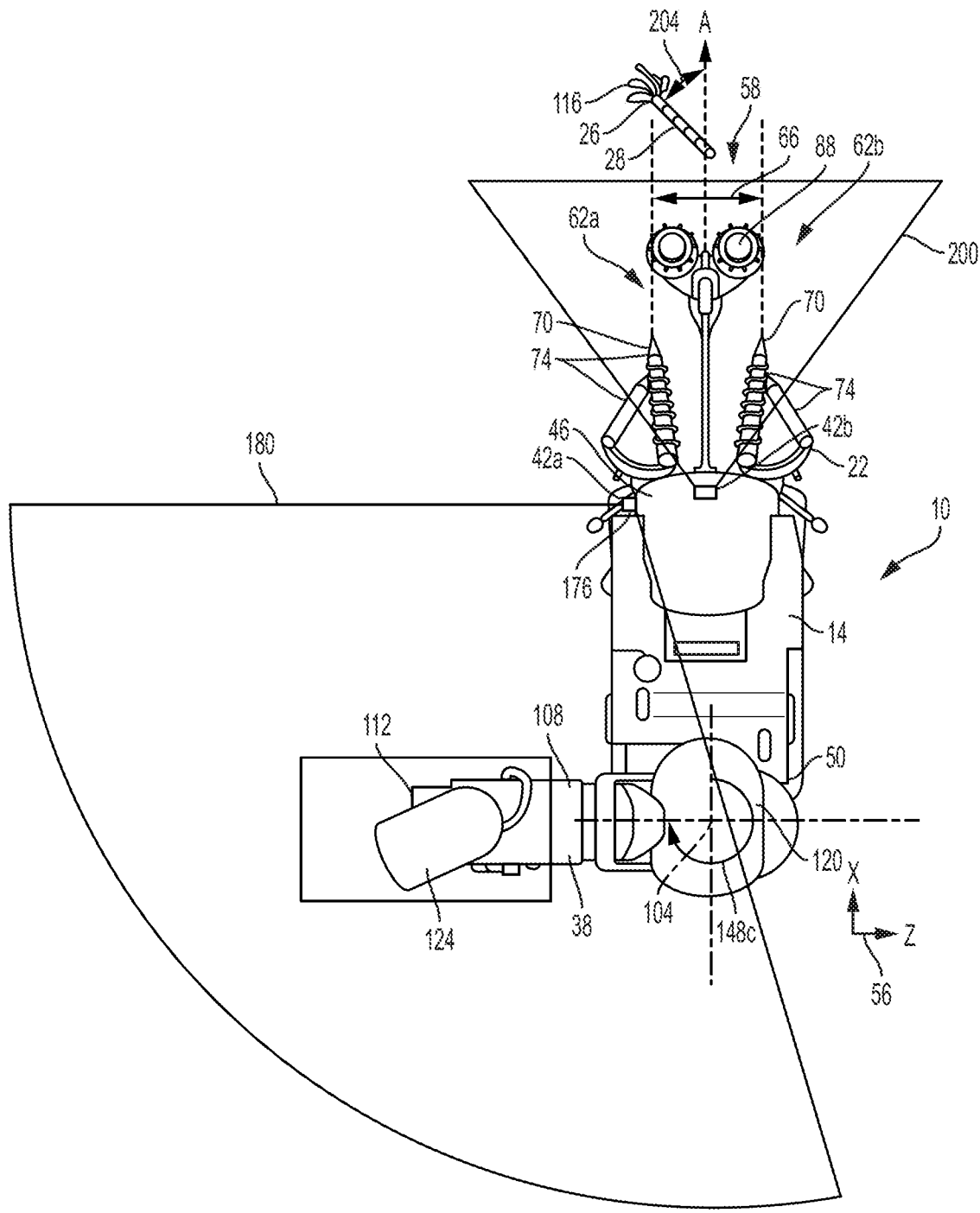
FIG. 2 is a top view of the harvester of FIG. 1 with the elevator in a first dump position.
Figure 3:
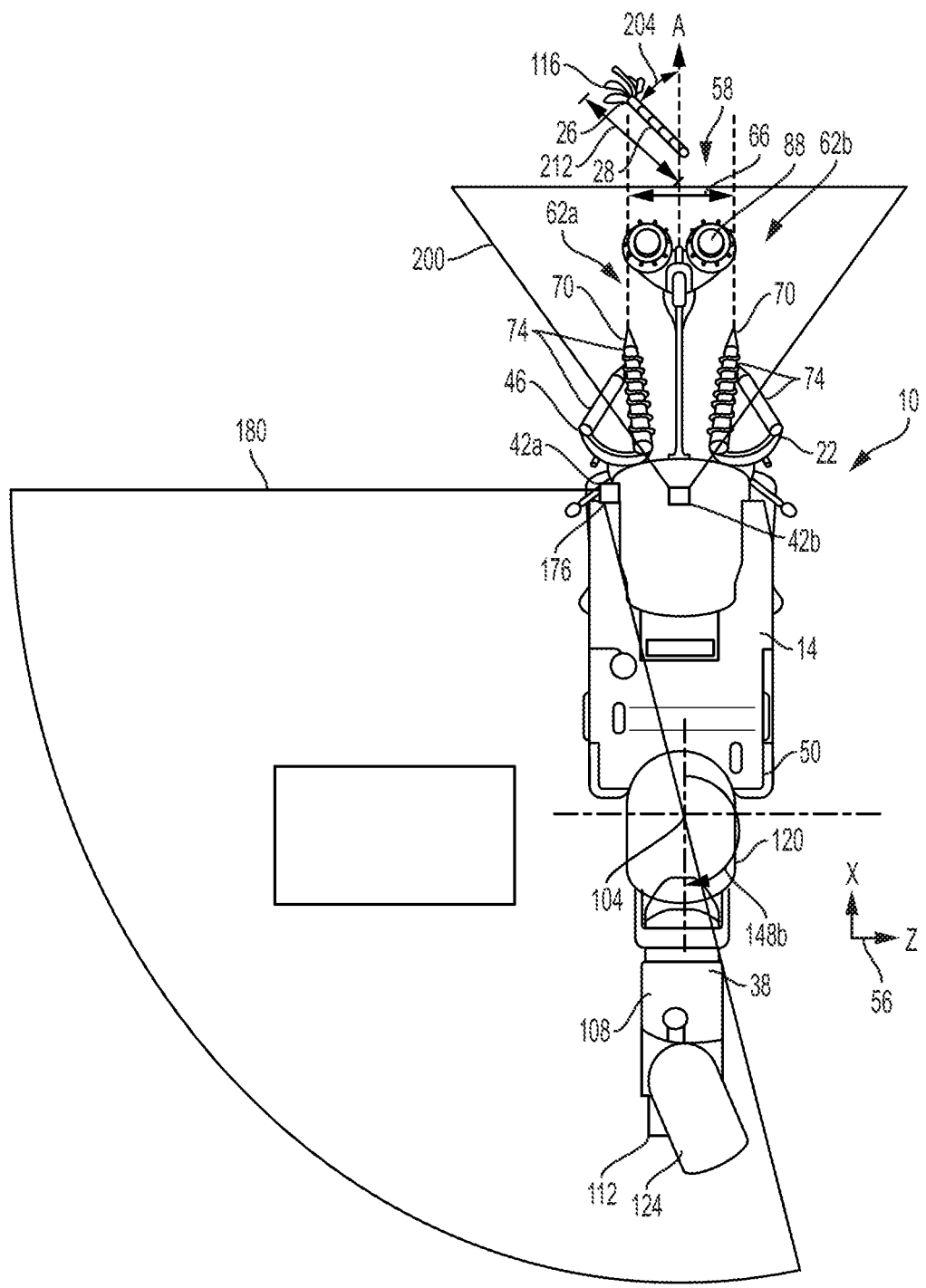
FIG. 3 is a top view of the harvester of FIG. 1 with the elevator in a second dump position.
Figure 4:
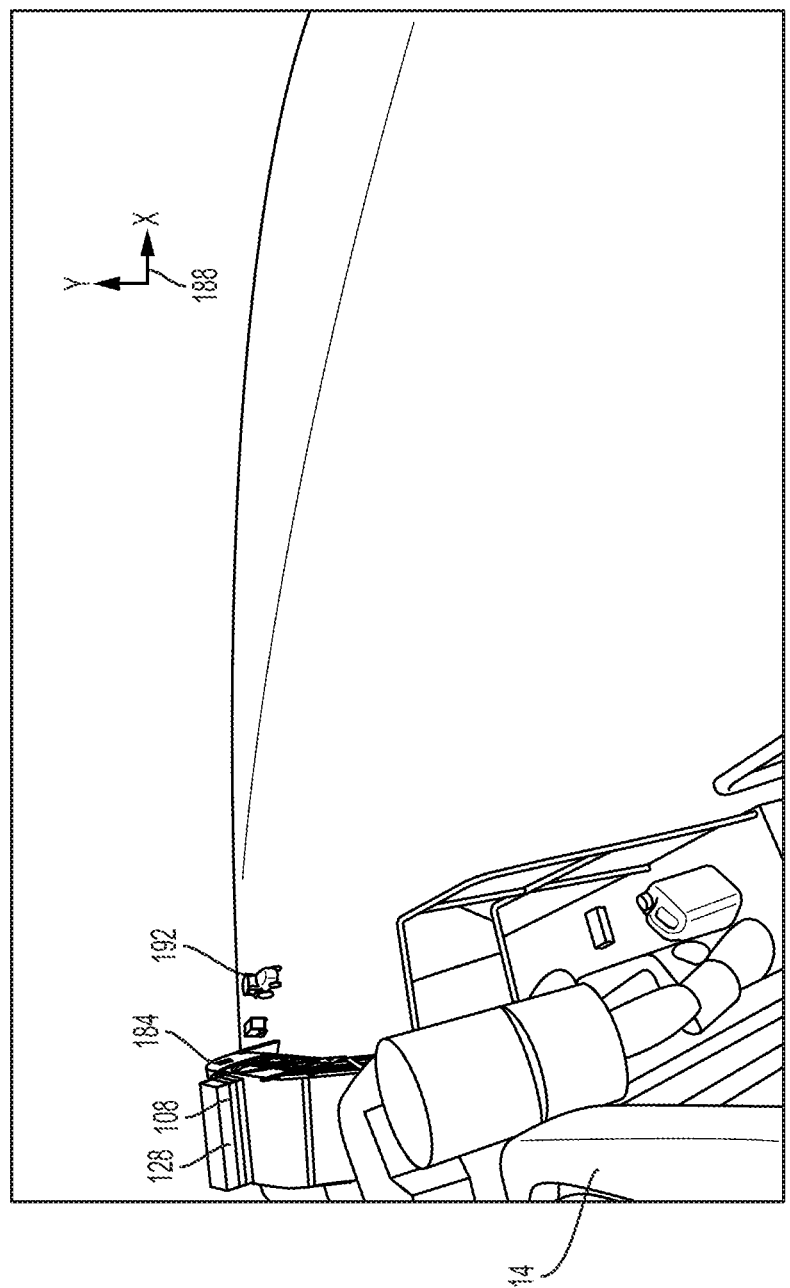
FIGS. 4-14 illustrate the first field of view taken with the harvester in various operating configurations.
Figure 5:
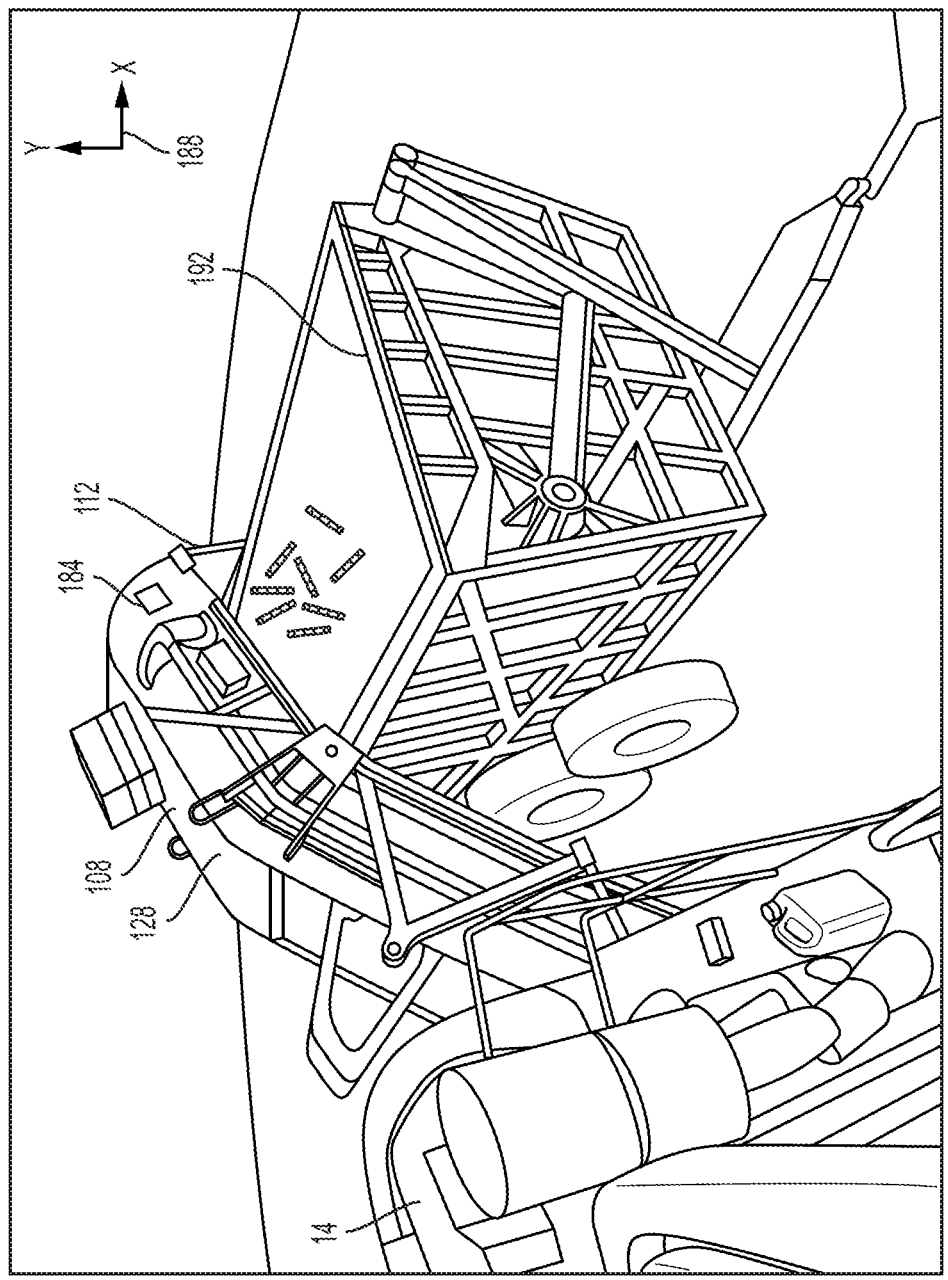
Figure 6:
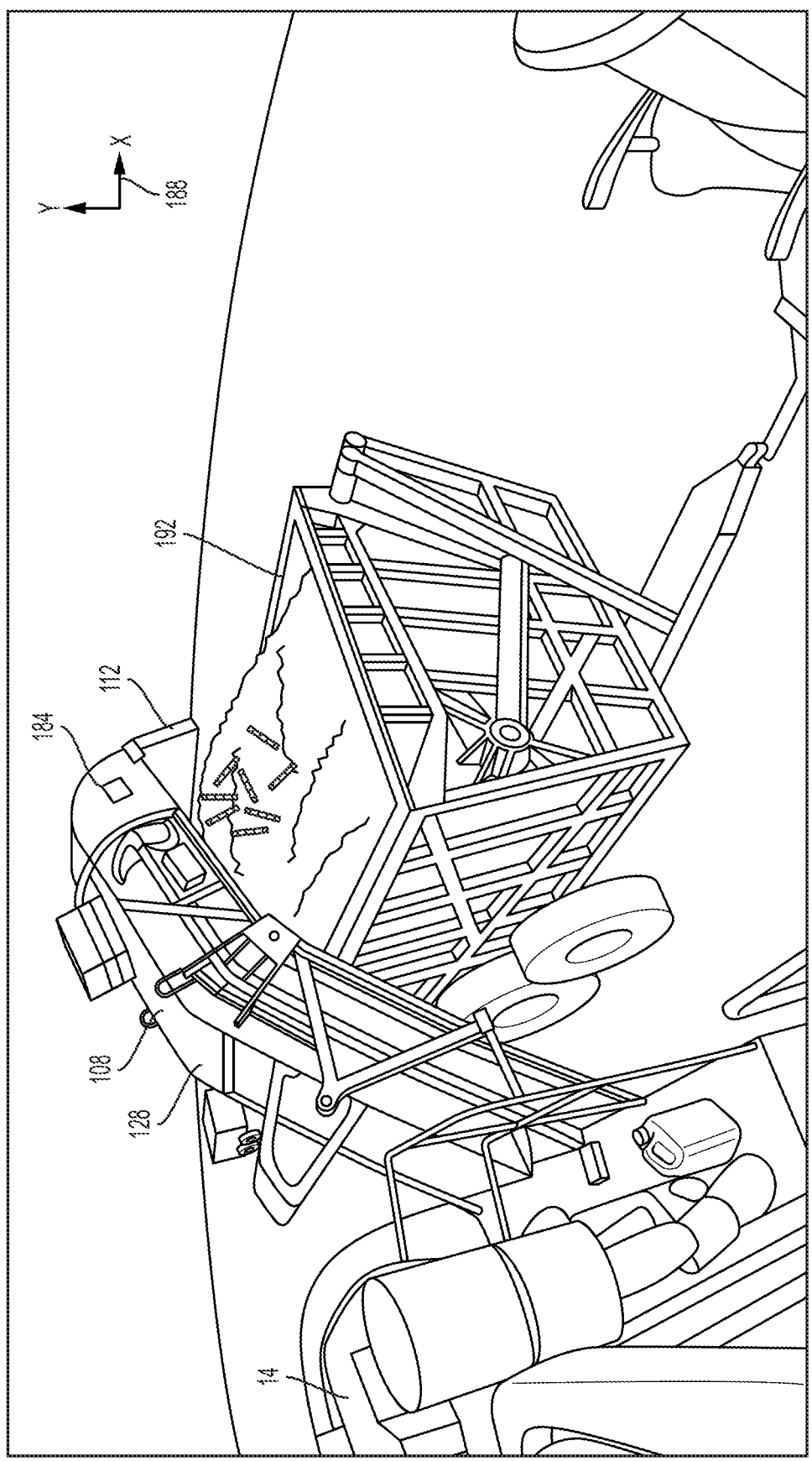
Figure 7:
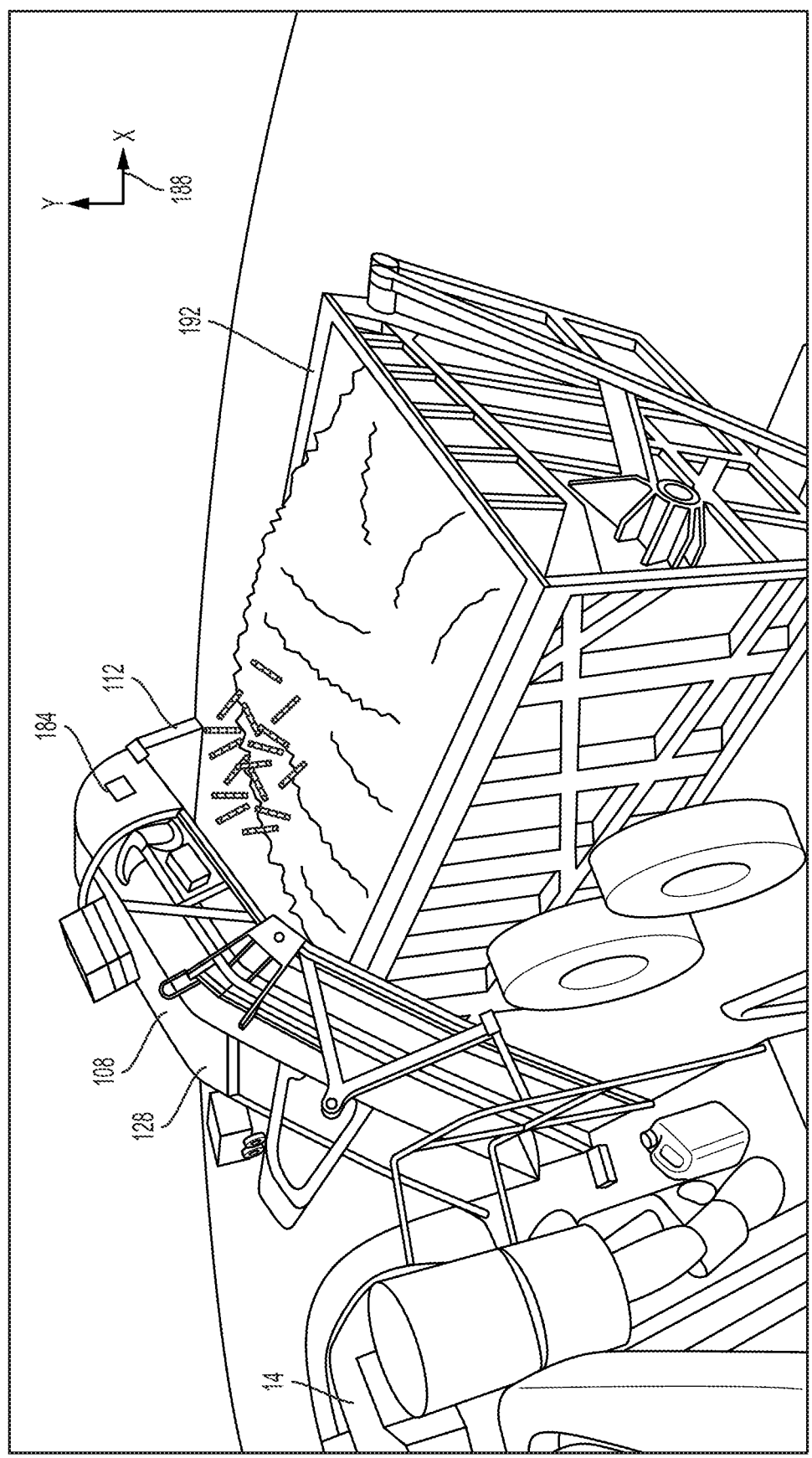
Figure 8:
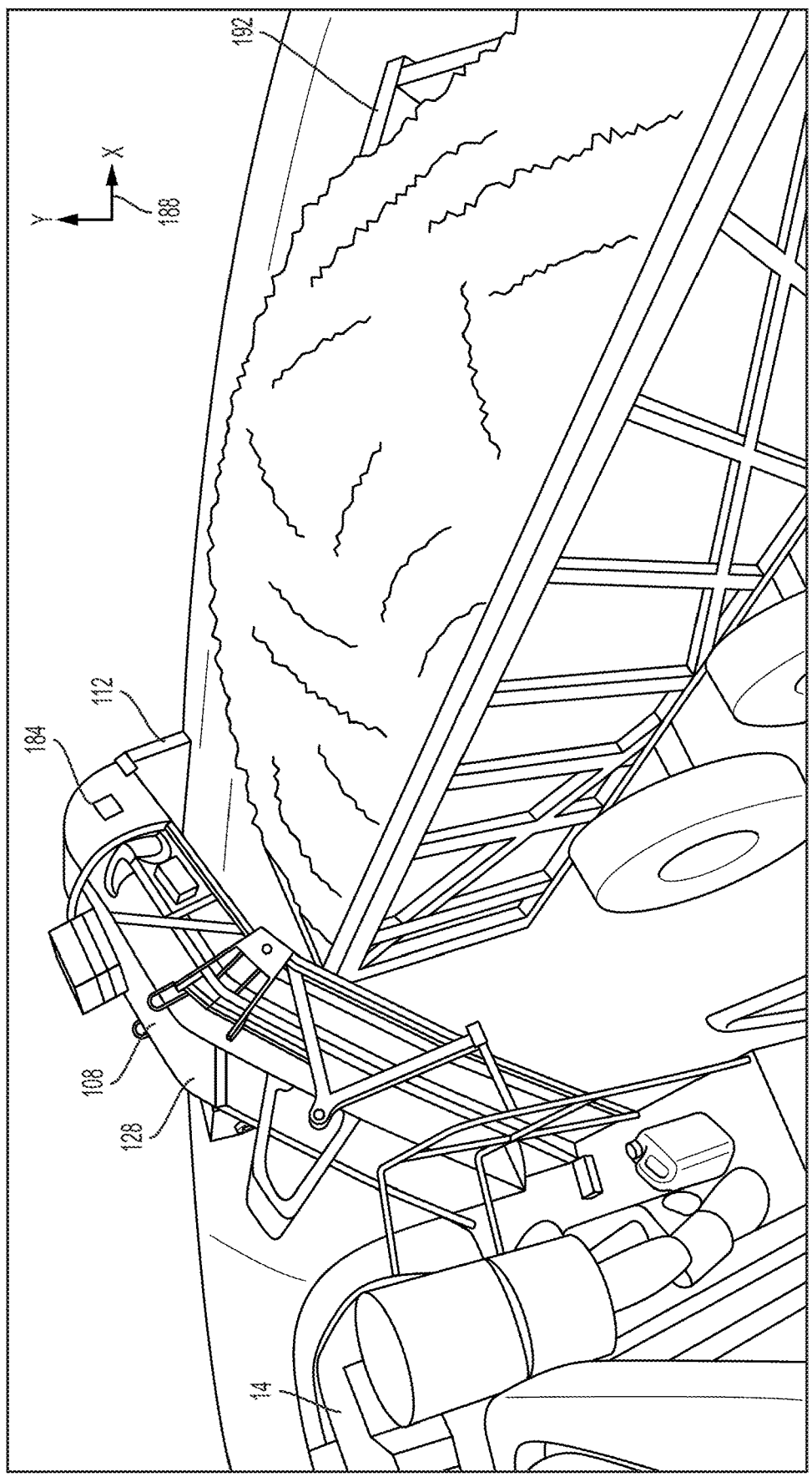
Figure 9:
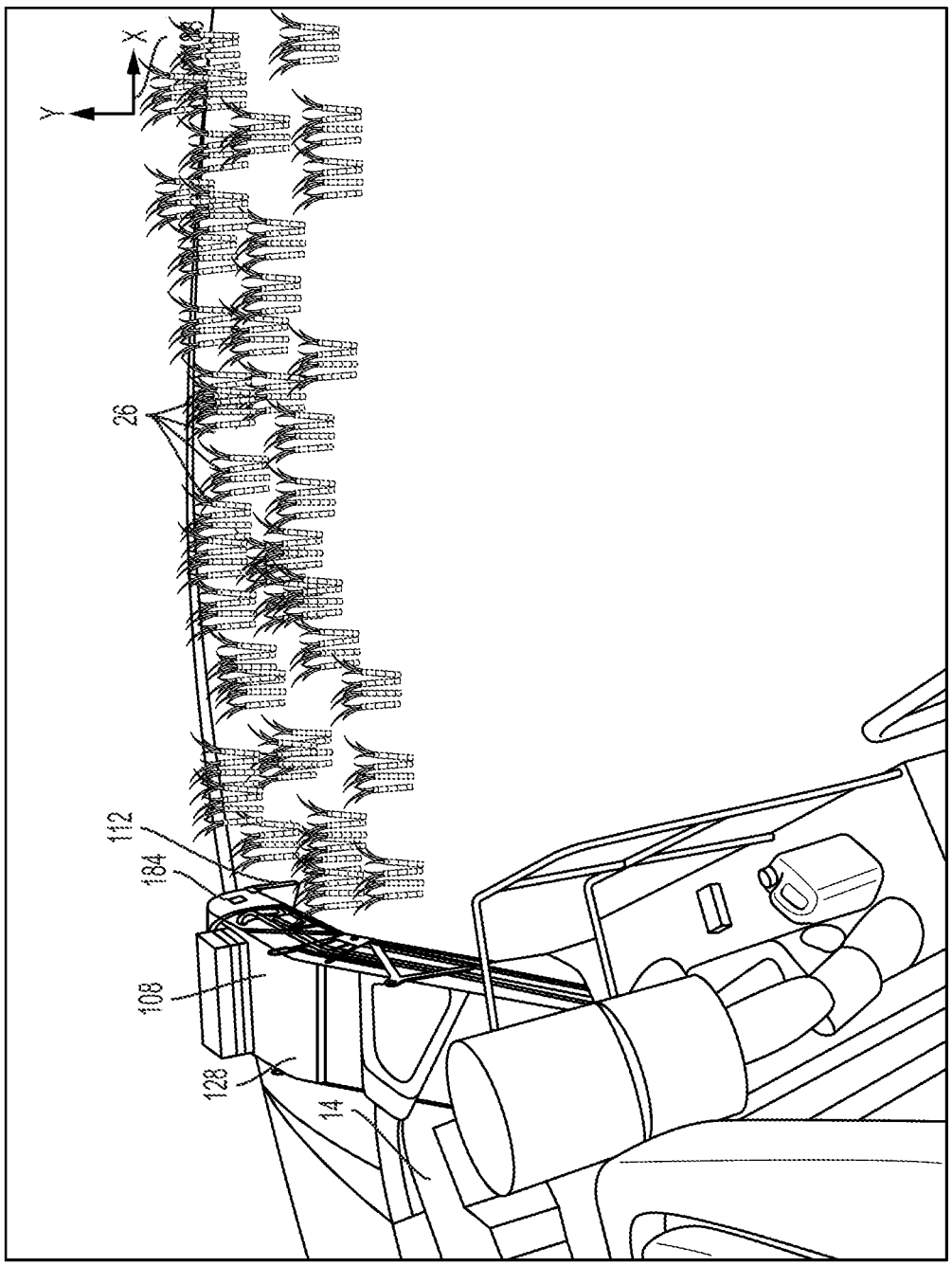
Figure 10:
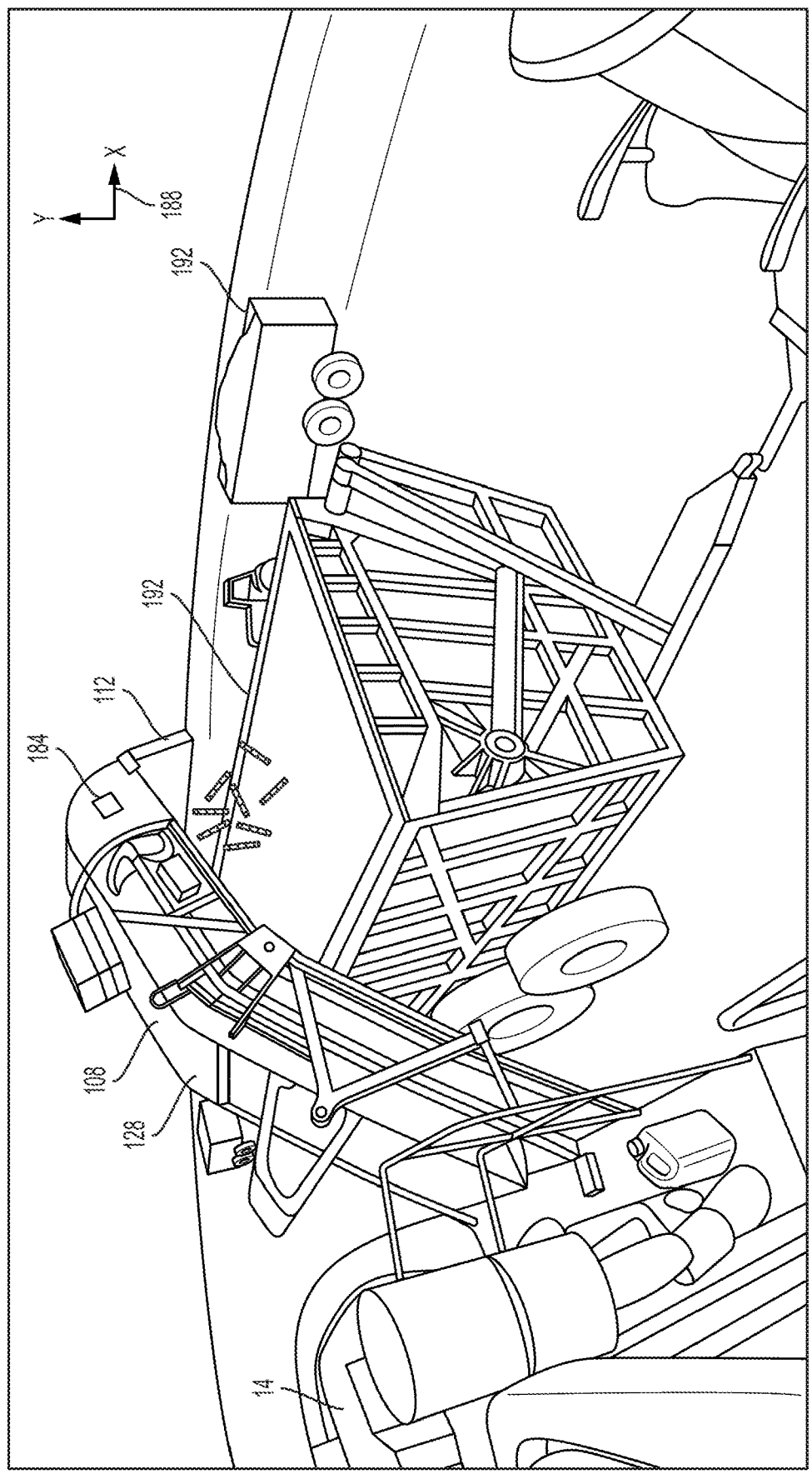
Figure 11:
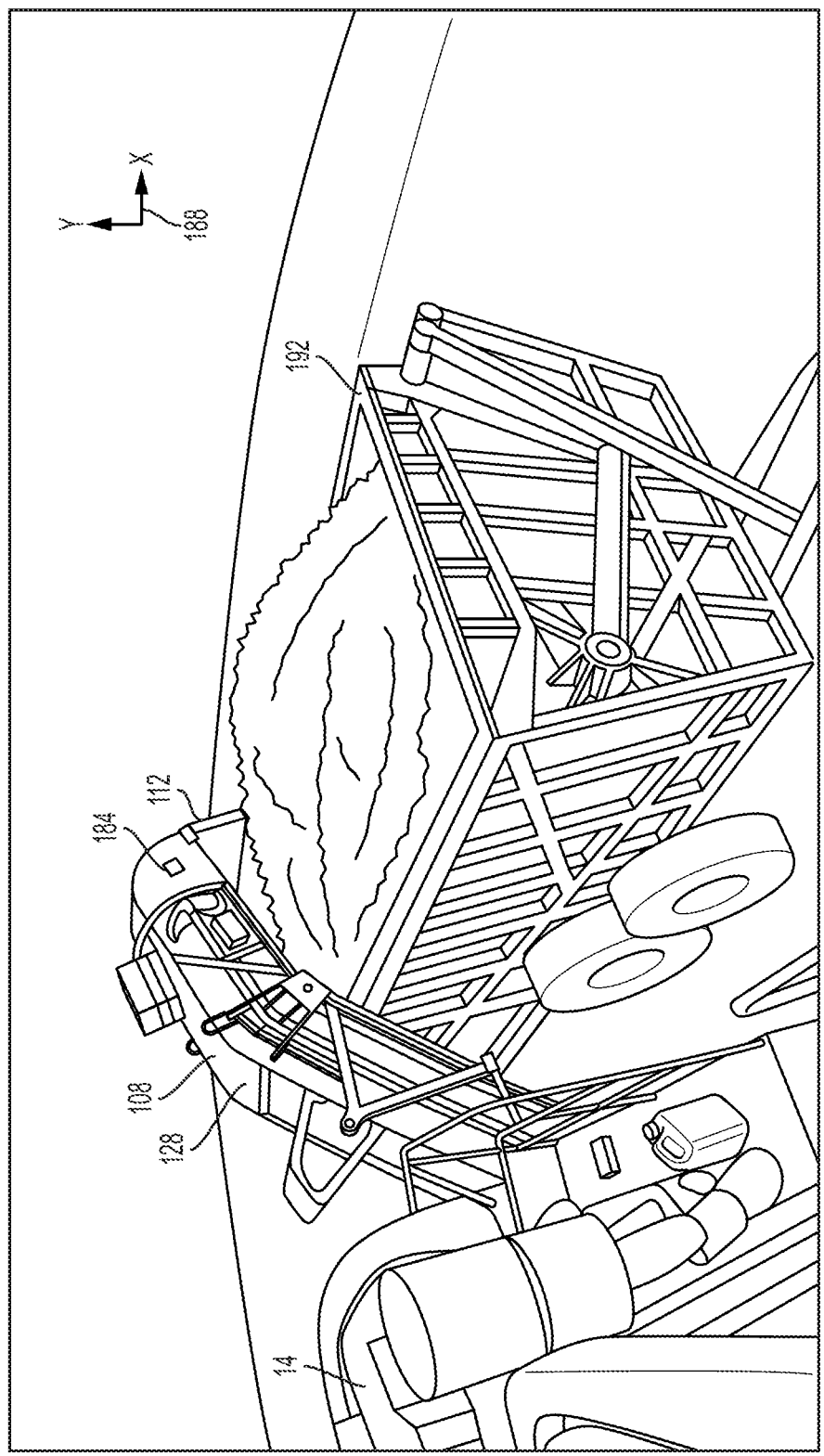
Figure 12:
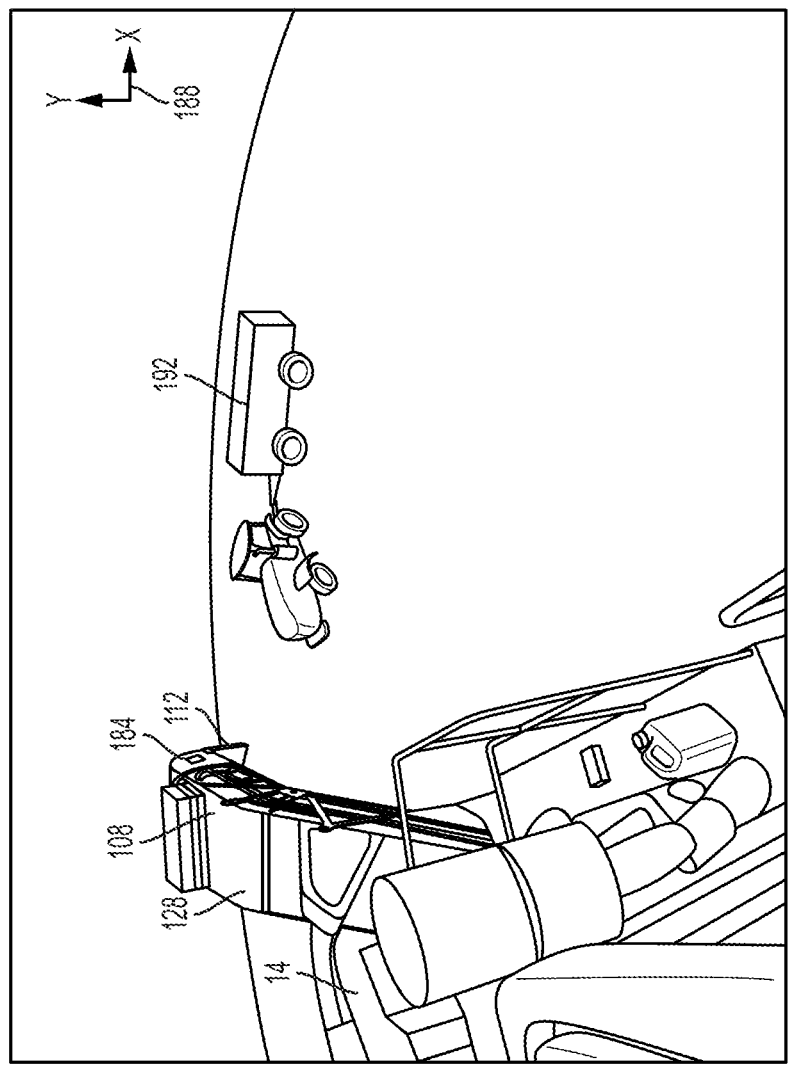
Figure 13:
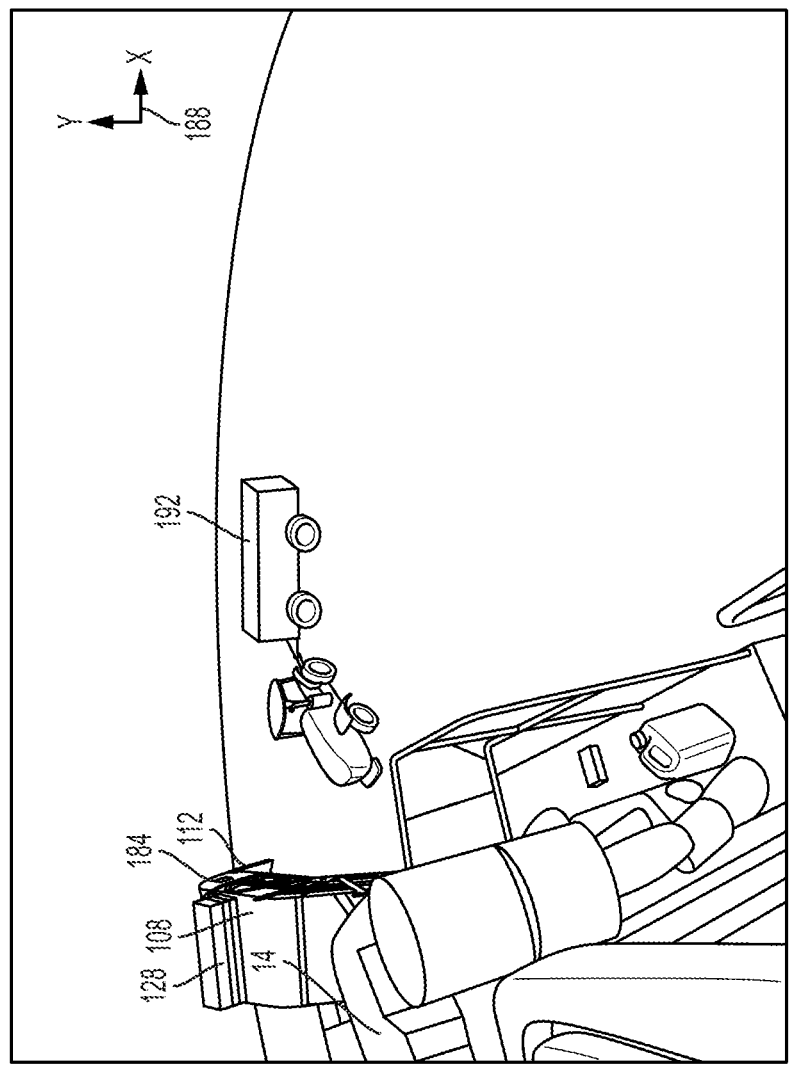
Figure 14:
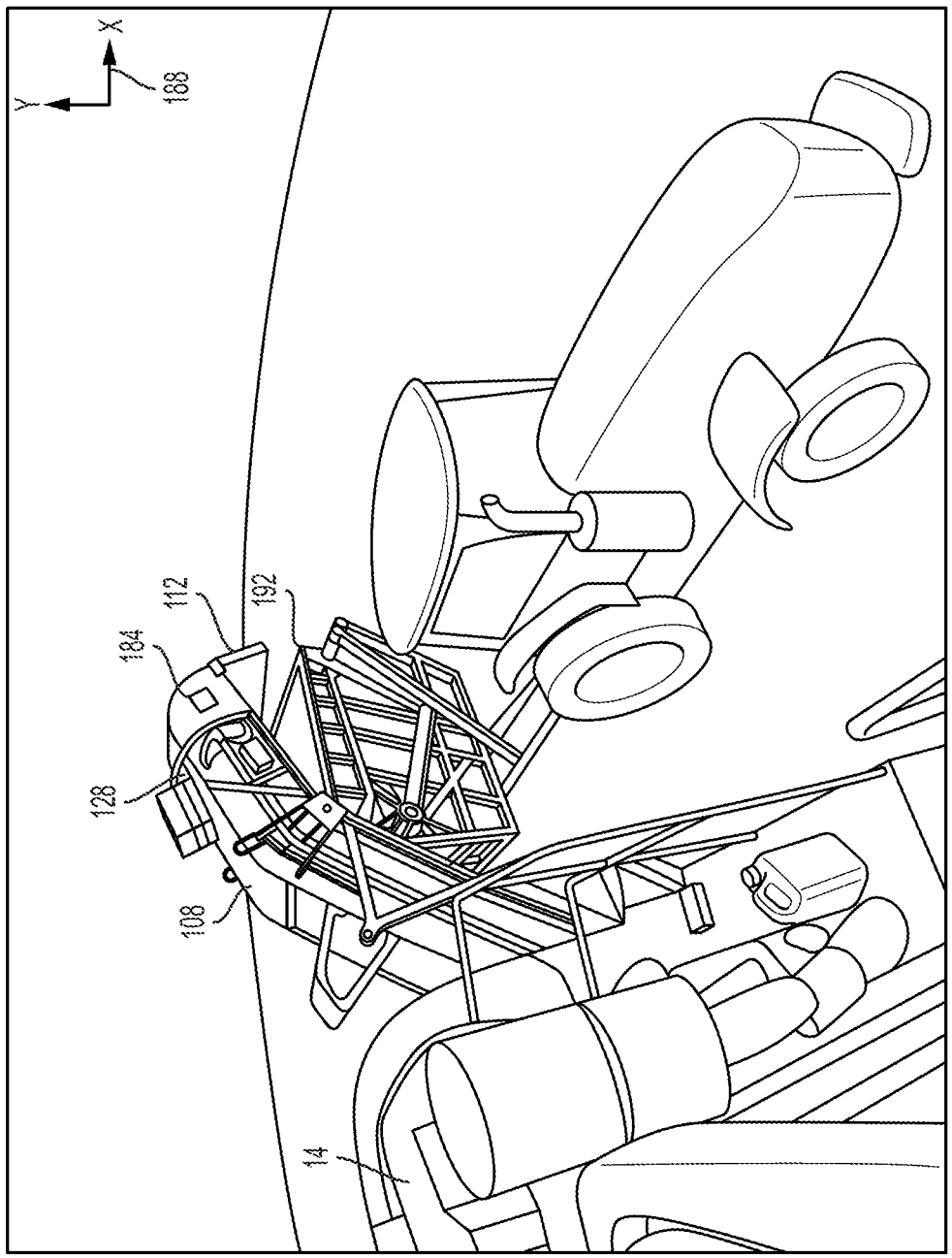

FIGS. 1-3 illustrate a harvester 10 having a frame 14, a power unit or engine (not shown) to provide power to the harvester 10, a head unit 22 configured to cut and collect crop material 26 from a field or other support surface 30, a processing assembly or chopper box 34 to process the crop material 26 collected by the head unit 22, and an unloading assembly 38 to unload the processed crop material 26 for subsequent collection. The harvester 10 also includes a controller 40 having a pair of control sub-assemblies 42*a*, 42*b* each configured to monitor and direct the various harvesting operations of the harvester 10. In the illustrated implementation, the harvester 10 is a sugarcane harvester although the control sub-assemblies 42*a*, 42*b* may be retrofit to any type or style of harvester.

In the illustrated implementation, the frame 14 of the harvester 10 includes a first or forward end 46 generally aligned with the direction of travel A, and a second or rear end 50 opposite the forward end 46. The frame 14 also includes a drive assembly 54 such as a plurality of wheels or a track coupled to the frame 14 and configured to support the frame 14 for travel over the support surface 30. As shown in FIGS. 1-3, the frame 14 also establishes a first, three-dimensional frame of reference 56 fixed relative thereto.

Illustrated in FIGS. 2 and 3, the harvester 10 also defines a cutting path 58 and a pair of flanking areas 62*a*, 62*b* adjacent to the cutting path 58. For the purposes of this application, the cutting path 58 includes the region projecting outwardly from the forward end 46 of the frame 14 that is limited on either side by the cutting width 66 of the head unit 22 (e.g., is positioned between the two crop dividers 70, described below). The flanking areas 62a, 62b, in contrast, project outwardly from the forward end 46 and are positioned outside the cutting path 58 (e.g., is positioned outside the two crop dividers 70, described below).

The head unit 22 of the harvester 10 is coupled to the forward end 46 of the frame 14 and is configured to cut and collect crop material 26 positioned in the cutting path 58 (described above). The head unit 22 includes a pair of crop dividers 70, one or more scrolls 74 coupled to the crop dividers 70, knock down rollers 78, a pair of base cutters (not shown), side knives (not shown), and a topper unit 88. The head unit 22 also defines the cutting width 66 defined as the distance between the two crop dividers 70 (see FIGS. 2 and 3).

During use, the head unit 22 is adjustable between an activated configuration, in which the head unit 22 receives an input (e.g., torque) from the power unit and is configured to actively cut and collect the crop material 26 in the cutting path 58 as the harvester 10 travels in the direction of travel A (e.g., the power unit is driving the elements of the head unit 22), and a deactivated configuration, in which the head unit 22 does not receive input from the power unit and is not configured to actively cut and collect the crop material 26 (e.g., the power unit is not driving the elements of the head unit 22). As such, the head unit 22 places a vastly increased load on the power unit when it is in the activated configuration.

Each crop divider 70 of the head unit 22 includes a substantially upright oriented wall configured to separate the crop material 26 positioned within the cutting path 58 (e.g., the items that will be processed by the head unit 22) from the crop material 26 that is positioned outside the cutting path 58 and in the adjacent regions 62a, 62b (e.g., crop material 26 that will not be processed by the head unit 22). During use, the position of the crop dividers 70 may be varied to adjust the cutting width 66 (e.g., the distance between the two crop dividers 70), and/or the cutting height 86 (e.g., the distance between the crop divider 70 and the support surface 30; see FIG. 1). More specifically, the crop dividers 70 may be adjustable between a deployed configuration, in which the crop dividers 70 are positioned proximate the support surface 30 and are in selective contact therewith, and a retracted or stowed configuration, in which the crop dividers 70 are spaced away from and do not contact the support surface 30.

In some implementations, the crop dividers 70 may include "floating" crop dividers where the crop dividers 70 are configured to move freely along the support surface 30 and compensate for changes in the contour thereof. In such implementations, the crop dividers 70 are adjustable between a deployed configuration, in which the crop dividers 70 are actively "floating" along the support surface 30, and a stowed configuration, in which the crop dividers are retracted away from and out of engagement with the support surface 30.

Each scroll 74 of the head unit 22 is rotatably coupled to a corresponding crop divider 70 and includes a substantially cylindrical body 90 with one or more spiral-shaped fins 94 extending therefrom. During use, each scroll 74 rotates relative to the crop dividers 70 and is configured to engage and manipulate the crop material 26 as it comes into contact therewith. In particular, each scroll 74 is generally configured to bias the crop material 26 into a generally upright orientation and, in some instances, direct the crop material 26 inwardly toward the knockdown rollers 78. Each scroll 74 is adjustable between an activated configuration, in which the scroll 74 receives input from the power unit 18 and rotates with respect to the head unit 22, and a deactivated configuration, in which the scroll 74 does not receive an input from the power unit 18 and therefore does not rotate with respect to the head unit 22. In the illustrated implementation, the head unit 22 includes an inner set of scrolls 74a, and an exterior set of scrolls 74b. However, in alternative implementation more or fewer scrolls 74 may be present.

The topper unit 88 of the head unit 22 is coupled to the frame 14 of the harvester 10 and configured to cut the crop material 26 at a preselected cutting height 86 from the support surface 30. More specifically, the topper 88 is configured to remove leafy material 116 from the tops of the stalks 28. As such, the topper 88 is coupled to the harvester 10 such that the cutting height 86 can be adjusted to accommodate crop material 26 having different heights.

Illustrated in FIGS. 1-14, the unloading assembly 38 of the harvester 10 includes a base 100 fixedly coupled to the rear end 50 of the frame 14, a first axis 104 defined by the base 100, an elevator 108 pivotably coupled to the base 100 for rotation about the first axis 104, and a material outlet 112 at least partially defined by the elevator 108. During use, the unloading assembly 38 receives processed crop material 26 from the processing assembly 34, separates leafy material 116 from the crop material 26, and unloads the remaining crop material 26 (generally in the form of shortened lengths or billets of stalk 28) via the material outlet 112. Once separated, the unloading assembly 38 is also configured to unload the leafy material 116 via a primary and a secondary extractors 120, 124, described below.

The elevator 108 of the unloading assembly 38 includes an elongated body 128 having a first end 132 pivotably coupled to the base 100, a second end 136 opposite the first end 132 that at least partially defines the material outlet 112, and a bin flap 114 positioned within the material outlet 112 to help direct the crop material 26 being unloaded therefrom. The elevator 108 also includes a conveyor 140 extending the length of the body 128 that is configured to convey crop material 26 from the first end 132, toward the second end 136, and out the material outlet 112.

In the illustrated implementation, the first axis 104 is substantially vertical (i.e., normal to the support surface 30) such that rotation of the elevator 108 about the first axis 104 causes the second end 136 of the elevator 108 to move along a substantially arcuate path in which the second end 136 maintains a constant distance from the support surface 30 (e.g., a constant dump height 144; see FIG. 1). However, in alternative implementations the elevator 108 may also include additional degrees of freedom including, but not limited to, pivoting the first end 132 about a second, horizontal axis (not shown) set perpendicular to the first axis 104 to allow the user to adjust the dump height 144 of the material outlet 112 by changing the vertical angle 118 of the body 128 of the conveyor 108. In still other implementations, the elevator body 128 may be formed from multiple segments (not shown) to allow even more flexibility in the unloading operation.

During use, the elevator 108 is continuously rotatable relative to the base 100 about the first axis 104 between a plurality of different unload positions. More specifically, the elevator 108 is rotatable between a first position, in which the elevator 108 forms a first dump angle (not shown) with respect to the frame 14 of approximately 90 degrees (thereby generally positioning the material outlet 112 on the starboard side of the harvester 10, not shown), a second position, in which the elevator 108 forms a second dump angle 148b with respect to the frame 14 of approximately 180 degrees (thereby generally positioning the material outlet 112 near the rear end 50 the harvester 10), and a third position, in which the elevator 108 forms a third dump angle 148c with respect to the frame 14 of approximately 270 degrees (thereby generally positioning the material outlet 112 on the port side of the harvester 10). For the purposes of this application, the dump angle 148 of the elevator 108 includes the angle formed about the first axis 104 between a first ray substantially aligned with the direction of travel A, and a second ray extending along the body 128 of the elevator 108 (see FIGS. 2 and 3).

The unloading assembly 38 also includes a primary extractor 120 configured to unload the leafy material 116 separated from the crop material 26 during processing. In the illustrated implementation, the primary extractor 120 includes a first chute 152 that is rotatable with respect to the base 100 independently of the elevator 108 about the first axis 104, and a primary fan (not shown) to direct the flow of leafy material 116 through the chute 152.

The discharge assembly 38 also includes a secondary extractor 124 coupled to the elevator 108 proximate the second end 136 thereof. The secondary extractor 124 is configured to discharge any remaining leafy material 116 positioned on the conveyor 140 before reaching the material outlet 112. In the illustrated implementation, the secondary extractor 124 includes a second chute 160 that is rotatable with respect to the elevator 108, and a secondary fan (not shown) to direct the flow of leafy material 116 through the chute 160.

Illustrated in FIGS. 1-3, the controller 40 of the harvester 10 includes a first control sub-assembly 42a, generally directed toward the control of the unload assembly 38, and a second control sub-assembly 42b, generally directed toward the control of the head unit 22. While the illustrated implementation includes two sub-assemblies 42a, 42b each configured to operate specific systems of the harvester 10, it is to be understood that more or fewer sub-assemblies may be present.

The first control sub-assembly 42a of the harvester 10 includes a processor 168, a memory unit 172 in operable communication with the processor 168, and a mono-camera 176 (e.g., a two-dimensional camera) sending and receiving signals from the processor 168. The processor 168 may also be in operable communication with various elements of the harvester 10 such as the unload assembly 38, the head unit 22, and the processing unit 34. During use, the processor 168 receives signals from the mono-camera 176 and enters that information into one or more control algorithms to calculate the position of one or more elements of the unload assembly 38 within the three-dimensional space of the first reference frame 56.

In particular, the harvester 10 includes a mono-camera 176 coupled to the frame 14 of the harvester 10 that defines a first field of view 180 (see FIGS. 2 and 3). In the illustrated implementation, the camera 176 is mounted proximate the forward end 46 of the frame 14 and is oriented in a substantially rearward direction such that the first field of view 180 at least partially includes the elevator 108 of the discharge assembly 38 therein (see FIGS. 4-14). Furthermore, the camera 176 is mounted such that that the distance and orientation between the camera 176 and the base 100 of the unload assembly 38 is fixed and known. In alternative implementations, the distance and orientation between the camera 176 and the base 100 of the discharge assembly 38 may be adjustable; however in such implementations, the adjustments are recorded by one or more sensors (not shown) in operable communication with the processor 168.

During the harvesting process, the mono-camera 176 conveys a series of images to the processor 168 where each image includes a two-dimensional representation of the first field of view 180 (see FIGS. 4-14). After receiving the raw image data, the processor 168 is configured to locate the presence of a reference point 184 within each image using at least one of vision based target detection, trained neural networks, texture recognition, and the like. The reference point 184, in turn, includes a target fixedly coupled to or applied on the item being tracked by the camera 176 (e.g., the body 128 of the elevator 108). In the illustrated implementation, the target includes a unique color combination or pattern that allows the camera 176 and processor 168 to more easily detect and track the reference point 184 in a variety of atmospheric and lighting conditions. However, in alternative implementations, the reference point 184 may include a specific location on the item itself that the camera software is trained to recognize (e.g., the location of a specific bolt, outlet, and the like).

Although not illustrated, more than one reference point 184 may be used in instances where redundancy, additional data, or more than one item is to be tracked. In such implementations, each reference point 184 may be unique in some way (e.g., having a unique pattern, indicia, color, shape, and the like) to allow the processor 168 to distinguish between each individual reference point.

After identifying the reference point 184 within a particular image, the processor 168 establishes the position or coordinates of the reference point 184 relative to a second, two-dimensional reference frame 188 overlaid onto the images of the first field of view 180. By repeating this process for multiple, subsequent images, the processor 168 is able to track and record the movements of the reference point 184 relative to the second reference frame 188.

With the location of the reference point 184 established relative to the second, two-dimensional reference frame 188, the processor 168 then enters the location data into a position algorithm that, in turn, outputs the three-dimensional location of the reference point 184 relative to the first, three-dimensional reference frame 56 established by the frame 14 of the harvester 10. To do so, the control algorithm takes into account, among other things, the known location and orientation of the camera 176 relative to the base 100 of the discharge assembly 38, the location where the reference point 184 is fixed to the elevator body 128, and the known movement characteristics of the elevator 108 itself. Using this information, the processor 168 is able to establish a function that associates a unique three-dimensional location within the first reference frame 56 for each possible reference point 184 location within the second reference frame 188. Still further, the processor 168 is then able to determine the current operating parameters of the elevator 108 (e.g., the current dump height 144 and dump angle 148) based on the location of the reference point 184 in three-dimensional space. As such, the processor 168 is able to calculate the current dump angle 148 and dump height 144 of the elevator 108 using only a two-dimensional input.

While the above described control sub-assembly 42a is configured to calculate the operating parameters of the elevator 108, the control assembly 42a may also be used to track the location of additional elements of the harvester 10. For example, the control assembly 42a may be used to track the primary extractor 120, the secondary extractor 124, the bin flap 114, and the like. In each instance, additional reference points (not shown) may be coupled to the relevant elements to allow the processor 168 to monitor and track the movement of each element individually. In still other implementations, the processor 168 may use the calculated location of a first item as an input to calculate the location of a second item that is dependent on the first item's location. For example, the processor 168 may use the location of a first reference point 184 coupled to the elevator 108 to calculate the current location of the elevator 108, and then use the elevator's location as an input to further calculate the location and orientation of the secondary extractor 124 using a second reference point (not shown) coupled thereto.

In addition to tracking the location of elements directly mounted to the harvester 10, the processor 168 of the first control assembly 41a may also apply vision based target detection, trained neural networks, texture recognition, and the like to the images produced by the mono-camera 176 to detect the presence or absence of items not directly attached to the harvester 10. For example, the processor 168 may be configured to detect and recognize the presence of a haulout 192 within the first field of view 180. Still further, the processor 168 may also us vision based target detection, trained neural networks, texture recognition, and the like to determine when the haulout 192 is properly positioned alongside the harvester 10 and ready to receive crop material 26 therein. In still other implementations, the processor 168 may be configured to detect when the haulout 192 is empty or full of crop material 26.

In addition to the above described detection capabilities, the control sub-assembly 41a may also use the calculated information to automate portions of unloading and harvesting processes. For example, the processor 168 may be configured to start and stop the unloading process based at least in part on the detection that the haulout 192 is positioned within the first field of view 180. Still further, the processor 168 may start or stop the unloading process based at least in part on whether the haulout 192 is full or empty. Still further, the processor 168 may be configured to rotate the elevator 108 to a predetermined dump angle 148 based at least in part on the presence or absence of a haulout 192 on a particular side of the harvester 10. In still other implementations, the processor 168 may be configured to adjust the operation of the primary and secondary extractors 120, 124.

While the illustrated sub-assembly 42a includes a single camera. It is to be understood that in alternative implementations that more than one camera may be used, each having a unique field of view. In such implementations, the processor 168 may be configured to track the reference point as it moves from the field of view of one camera to the field of view of another camera.

Illustrated in FIG. 1, the second control sub-assembly 42b of the harvester 10 includes a three-dimensional camera 196 configured to send and receive signals with the processor 168. During use, the processor 168 receives signals from the camera 196 and enters the corresponding information into one or more control algorithms to determine the presence, location, and attributes of any crop material 26 positioned ahead of the harvester 10 (i.e., adjacent to the forward end 46).

More specifically, the harvester 10 includes a three-dimensional camera 196 coupled to the frame 14 of the harvester 10 that defines a second field of view 200 (see FIGS. 2 and 3). In the illustrated implementation, the camera 196 is mounted proximate the forward end 46 of the frame 14 and is oriented in a substantially forward direction such that the second field of view 200 at least partially includes the head unit 22, the cutting path 58, and the flanking areas 62a, 62b therein. In the illustrated implementation, the camera 196 is a three-dimensional or stereo style camera able to output three-dimensional representations of the second field of view 200. In alternative implementations, the camera 196 may include LIDAR, structured light, stereo vision, RADAR, and other known three-dimensional camera systems.

Figure 15:
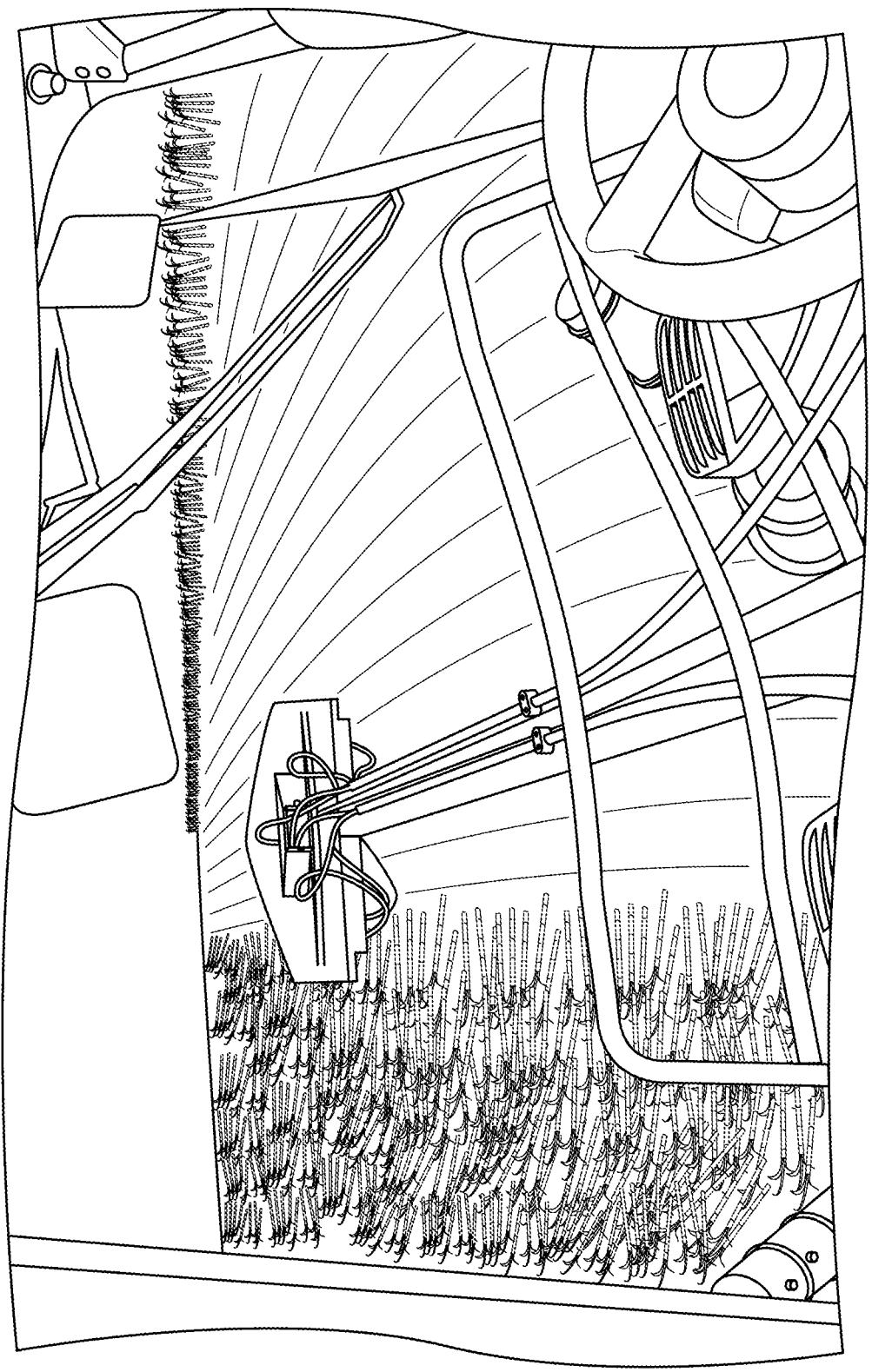
FIG. 15 illustrates a forward view of the cab of a harvester showing crop material in a −90 degree lay orientation with a 0 degree lay angle.

The detected "attributes" of the crop material 26 may include, among other things, the lay orientation 204, the lay angle 208, and the stalk height 212 (see FIGS. 1-3). For the purposes of this application, the lay angle 208 of the crop material 26 includes the angle formed between the stalk 28 of the crop material 26 and the support surface 30 and is configured to quantify how "upright" the stalk 28 is standing relative thereto. For example, a stalk 28 lying flat on the support surface 30 defines a lay angle 208 of 0 degrees while a stalk 28 standing perfectly upright defines a lay angle 208 of 90 degrees. Furthermore, the lay orientation 204 of the crop material 26 includes the angle formed between the vertical projection of the stalk 28 onto the support surface 40 and the direction of travel A (see FIGS. 2 and 3). The lay orientation 204 is configured to measure the direction in which the stalk 28 of the crop material 26 is tilted. For example, a stalk 28 that is tilted parallel to the direction of travel A defines a lay orientation 204 of 0 degrees while a stalk 28 that is angled toward the port side of the harvester 10 (as shown in FIGS. 2 and 3) defines a negative lay orientation 204. While not shown, a stalk 28 that is angled toward the starboard side of the harvester 10 defines a positive lay orientation 204. Finally, the stalk height 212 of the crop material 26 includes the length of the stalks 28 of the crop material 26. For example, FIG. 15 illustrates crop material having a −90 degree lay orientation 204 and a 0 degree lay angle 208.

During the harvesting process, the stereo-camera 196 conveys a continuous series of images to the processor 168 where each image includes a three-dimensional representation of the second field of view 180. After receiving the raw data, the processor 168 is configured to apply vision based target detection, trained neural networks, texture recognition, and the like to the images to extract data therefrom. In the illustrated implementation, the processor 168 is configured to first detect the presence or absence of crop material 26 in the cutting path 58, the first flanking area 62a, and the second flanking area 62b. In the areas where crop material 26 is present, the processor 168 is then configured to determine, among other things, the lay orientation 204, the lay angle 208, and the stalk height 212 of the crop material 26 contained therein.

With the general attributes of the crop material 26 detected, the processor 168 than inputs the information into one or more control algorithms to dictate the parameters of the harvesting operation. For example, the processor 168 is configured to adjust the cutting height 86 of the topper 88 based at least in part on the stalk height 212 and/or the lay angle 208 of the crop material 26 positioned within the cutting path 58. Still further, the processor 168 is also configured to turn the topper 88 on and off based at least in part on the presence or absence of crop material in the cutting path 58.

With respect to the elevator 108, the processor 168 is configured to adjust the dump angle 104 of the elevator 108 based at least in part on the absence or presence of crop material 26 in each of the flanking areas 62a, 62b. More specifically, the processor 168 is configured to adjust the dumping angle 148 of the elevator 108 so that the material outlet 112 is positioned on the side of the harvester 10 where no crop material 26 is present.

With respect to the crop dividers 70, the processor 168 is configured to adjust the crop dividers 70 between the deployed and retracted configurations based at least in part on the presence or absence of crop material 26 in the cutting path 58. In some implementations, the processor 168 may only disengage the crop divider 70 adjacent the flanking area 62a, 62b where no crop material 26 is present while maintaining the crop divider 70 positioned adjacent the flaking area 62a, 62b where crop material 26 is present in the engaged configuration. In still further implementations, the processor 168 is configured to disengage the crop dividers 70 if the lay angle 208 of the crop material 26 exceeds a predetermined threshold (e.g., the crop material 26 is sufficiently "upright" to not require crop dividers 70).

Still further, the processor 168 may be configured to adjust the head unit 22 as a whole between the activated and deactivated configurations based at least in part on the presence or absence of crop material 26 in the cutting path 58. While not listed specifically, it is also understood that the processor 168 may adjust or modify the operating parameters of any of the elements of the head unit 22, processing assembly 34, or unloading assembly 38 at least partially based on the detected attributes of the crop material 26 positioned within the second field of view 180 to harvest the crop material 26 in the most efficient manner possible and while minimizing wear on the individual parts of the head unit 22 and fuel consumption by the power unit.

The invention claimed is:

1. A harvester comprising:
   a frame, wherein the frame establishes a first, three-dimensional reference frame;
   a head unit coupled to the frame;
   an unloading assembly with a material output, wherein the material output is movable with respect to the frame;
   a mono-camera having a first field of view, where the mono-camera outputs a first image representative of the first field of view, and wherein the first image is a two-dimensional representation of the first field of view; and
   a controller in operable communication with the mono-camera, wherein the establishes a second two-dimensional reference frame fixed relative to the first field of view, wherein the controller identifies a reference point within the first image, wherein the controller locates the reference point within the second two-dimensional reference frame, and wherein the controller calculates a location of the reference point relative to the first, three-dimensional reference frame based on the position of the reference point within the second two-dimensional reference frame.

2. The harvester of claim 1, wherein the reference point is fixed relative to the material output.

3. The harvester of claim 1, wherein the unloading assembly includes a base fixedly coupled to the frame and a body movable with respect to the base about a first axis, and wherein the mono-camera is fixed relative to the base.

4. The harvester of claim 3, wherein the reference point is fixed relative to the body.

5. The harvester of claim 1, wherein the first field of view at least partially includes the material outlet therein.

6. A harvester comprising:
   a frame;
   a head unit coupled to the frame;
   an unloading assembly including:
      a base fixedly coupled to the frame,
      a body movable with respect to the base, and
      a material output formed by the body; and
   a mono-camera having a first field of view at last partially including the unloading assembly therein, where the mono-camera is configured to output a first image representative of the first field of view, and wherein the first image is a two-dimensional representation of the first field of view; and
   a controller in operable communication with the mono-camera, wherein the controller determines a position of the reference point relative to a two-dimensional reference frame overlaid onto the first image, and wherein the controller calculates the orientation of the body relative to the frame based at least in part on the location of the reference point within the two-dimensional reference frame and the known movement characteristics of the body relative to the frame.

7. The harvester of claim 6, wherein the reference point includes a target fixedly coupled to the body of the unloading assembly.

8. The harvester of claim 6, wherein the controller calculates the orientation of the body relative to the frame based at least in part on the known movement characteristics of the body relative to the frame.

9. A method of operating a harvester comprising:
   providing a harvester with a frame, a head unit coupled to the frame, and an unload assembly having a material output that is movable with respect to the frame;
   establishing a first reference frame fixed relative to the frame;
   mounting a mono-camera to the harvester having a first field of view, wherein the mono-camera is configured to output an image representative of the first field of view, and wherein the first image is a two-dimensional representation of the first field of view;
   establishing a second, two-dimensional reference frame fixed relative to the first field of view;
   identifying a reference point within the image;
   determining a location of the reference point relative to the second, two-dimensional reference frame;
   calculating a location of the reference point relative to the first frame of reference based on the location of the reference point relative to the second, two-dimensional reference frame.

10. The method of claim 9, wherein the reference point is fixed relative to the material output.

11. The method of claim 9, wherein the unload assembly includes a base fixedly coupled to the frame and a body movable with respect to the base about a first axis, and wherein the mono-camera is fixed relative to the base.

12. The method of claim 11, wherein the reference point is fixed relative to the body.

13. The method of claim 9, wherein the first field of view at least partially includes the material outlet therein.

* * * * *